United States Patent
Hergenrother et al.

(10) Patent No.: US 8,513,371 B2
(45) Date of Patent: *Aug. 20, 2013

(54) AMINO ALKOXY-MODIFIED SILSESQUIOXANES AND METHOD OF PREPARATION

(75) Inventors: William L. Hergenrother, Akron, OH (US); Ashley Hilton, Massillon, OH (US); Michael Hayes, Canton, OH (US); Walter Tomaszewski, Canton, OH (US); James H. Pawlow, Akron, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 351 days.

This patent is subject to a terminal disclaimer.

(21) Appl. No.: 12/346,994

(22) Filed: Dec. 31, 2008

(65) Prior Publication Data

US 2009/0203929 A1 Aug. 13, 2009

Related U.S. Application Data

(60) Provisional application No. 61/018,213, filed on Dec. 31, 2007, provisional application No. 61/017,932, filed on Dec. 31, 2007, provisional application No. 61/086,236, filed on Aug. 5, 2008.

(51) Int. Cl.
*C08G 77/26* (2006.01)

(52) U.S. Cl.
USPC .............................. 528/38; 528/12

(58) Field of Classification Search
USPC .................................. 528/36, 12
See application file for complete search history.

(56) References Cited

U.S. PATENT DOCUMENTS

| | | |
|---|---|---|
| 2,462,640 A | 2/1949 | Hyde |
| 3,186,965 A | 6/1965 | Plueddemanu |
| 3,304,318 A | 2/1967 | Brady |
| 3,428,706 A | 2/1969 | Walmsley et al. |
| 3,647,740 A | 3/1972 | Loree et al. |
| 3,734,763 A | 5/1973 | Plueddemann |
| 3,816,493 A | 6/1974 | Nitzsche et al. |
| 4,052,524 A | 10/1977 | Harakas et al. |
| 4,101,460 A | 7/1978 | Small et al. |
| 4,258,770 A | 3/1981 | Davis et al. |
| 4,269,741 A | 5/1981 | Hornan |
| 4,340,515 A | 7/1982 | Frassek et al. |
| 4,424,297 A | 1/1984 | Bey |
| 4,441,946 A | 4/1984 | Sharma |
| 4,512,897 A | 4/1985 | Crowder, III et al. |
| 4,694,040 A | 9/1987 | Hashimoto et al. |
| 4,745,145 A | 5/1988 | Schonfeld et al. |
| 4,822,681 A | 4/1989 | Schossler et al. |
| 4,847,162 A | 7/1989 | Haluska et al. |
| 4,889,747 A | 12/1989 | Wilson |
| 5,015,717 A | 5/1991 | Martin et al. |
| 5,162,409 A | 11/1992 | Mroczkowski |
| 5,359,022 A | 10/1994 | Mautner et al. |
| 5,363,994 A | 11/1994 | Angeline |
| 5,447,971 A | 9/1995 | Bergh et al. |
| 5,484,867 A | 1/1996 | Lichtenhan et al. |
| 5,534,592 A | 7/1996 | Halasa et al. |
| 5,552,476 A | 9/1996 | Halling |
| 5,650,474 A | 7/1997 | Yamaya et al. |
| 5,684,113 A | 11/1997 | Nakanishi et al. |
| 5,750,197 A | 5/1998 | van Ooij et al. |
| 5,750,610 A | 5/1998 | Burns et al. |
| 5,763,388 A | 6/1998 | Lightsey et al. |
| 5,830,934 A | 11/1998 | Krishnan |
| 5,844,060 A | 12/1998 | Furuya et al. |
| 5,854,369 A | 12/1998 | Geck et al. |
| 5,907,015 A | 5/1999 | Sexsmith |
| 5,914,364 A | 6/1999 | Cohen et al. |
| 5,916,973 A | 6/1999 | Zimmer et al. |
| 5,929,149 A | 7/1999 | Matsuo et al. |
| 5,932,757 A | 8/1999 | Standke et al. |
| 5,958,161 A | 9/1999 | Grimberg et al. |
| 5,969,057 A | 10/1999 | Schoeley et al. |
| 5,985,371 A | 11/1999 | Fujioka et al. |
| 5,985,953 A | 11/1999 | Lightsey et al. |
| 6,015,850 A | 1/2000 | Nakamura et al. |
| 6,033,597 A | 3/2000 | Yatsuyanagi et al. |
| 6,048,910 A | 4/2000 | Furuya et al. |
| 6,087,519 A | 7/2000 | Garnier et al. |

(Continued)

FOREIGN PATENT DOCUMENTS

| | | |
|---|---|---|
| CN | 101180344 A | 5/2008 |
| EP | 0025840 A1 | 7/1980 |

(Continued)

OTHER PUBLICATIONS

Nuss, A.J. et al., Decision of Technical Board of Appeal 3.3.1 dated Feb. 12, 1998, T990/96-3.3.1 (pp. 1-12).
Yu, Libing et al., "Preparation, Characterization, and Synthetic Uses of Lanthanide (III) Catalysts Supported on Ion Exchange Resins", J. Org. Chem., vol. 62, No. 11, pp. 3575-3581 (1997).
Database WPI Week 200026, Thomson Scientific, London, GB; AN 2000-298587, XP-002573380, & JP2000-086766, Mar. 28, 2000 (2 pp.).
Buestrich, Ralf, Apr. 15, 2008 Office Action from corresponding European Patent Application No. 06739416.3 (3 pp.).
Buestrich, Ralf, Aug. 17, 2009 Office Action from corresponding European Patent Application No. 06739416.3 (4 pp.).
Zimmer, Marc S., Nov. 20, 2009 Final Office Action from U.S. Appl. No. 11/387,569 (6 pp.).
Boiling Point Calculator from the web site http://www.partyman.se/boiling-point-calculator, downloaded Nov. 10, 2009 (2pp.).

(Continued)

*Primary Examiner* — Kuo-Liang Peng
(74) *Attorney, Agent, or Firm* — Meredith E. Hooker; Nathan T. Lewis

(57) ABSTRACT

An amino alkoxy-modified silsesquioxane (AMS) comprising one or more compounds selected from the group consisting of an amino AMS, an amino/mercaptan co-AMS, an amino/blocked mercaptan co-AMS, mixtures thereof, and a weak acid-neutralized solid or aqueous solution thereof, and a method of making the amino AMS, are presented. The compounds are useful in compounding, processing, cure and storage of silica-reinforced rubbers because they contain low levels of volatile organic compounds (VOC).

17 Claims, No Drawings

(56) References Cited

U.S. PATENT DOCUMENTS

| | | | |
|---|---|---|---|
| 6,124,491 | A | 9/2000 | Wotler et al. |
| 6,127,468 | A | 10/2000 | Cruse et al. |
| 6,140,447 | A | 10/2000 | Gay et al. |
| 6,162,547 | A | 12/2000 | van Ooji et al. |
| 6,191,247 | B1 | 2/2001 | Ishikawa et al. |
| 6,204,339 | B1 | 3/2001 | Waldman et al. |
| 6,232,424 | B1 | 5/2001 | Zhong et al. |
| 6,239,243 | B1 | 5/2001 | Deng et al. |
| 6,271,331 | B1 | 8/2001 | Gay et al. |
| 6,294,007 | B1 | 9/2001 | Martin |
| 6,313,205 | B1 | 11/2001 | Chiron et al. |
| 6,326,424 | B1 | 12/2001 | Louis et al. |
| 6,331,605 | B1 | 12/2001 | Lunginsland et al. |
| 6,361,871 | B1 | 3/2002 | Jenkner et al. |
| 6,372,843 | B1 | 4/2002 | Barruel et al. |
| 6,399,210 | B1 | 6/2002 | Zhong |
| 6,414,061 | B1 | 7/2002 | Cruse et al. |
| 6,426,378 | B1 | 7/2002 | Lickes et al. |
| 6,429,245 | B1 | 8/2002 | Francik et al. |
| 6,433,065 | B1 | 8/2002 | Lin et al. |
| 6,433,077 | B1 | 8/2002 | Craig et al. |
| 6,455,158 | B1 | 9/2002 | Mei et al. |
| 6,465,670 | B2 | 10/2002 | Thise et al. |
| 6,465,671 | B1 | 10/2002 | Bae et al. |
| 6,528,673 | B2 | 3/2003 | Cruse et al. |
| 6,548,573 | B1 | 4/2003 | Rempert |
| 6,548,594 | B2 | 4/2003 | Luginsland et al. |
| 6,573,356 | B2 | 6/2003 | Araki et al. |
| 6,608,125 | B2 | 8/2003 | Cruse et al. |
| 6,611,518 | B1 | 8/2003 | Ngo et al. |
| 6,624,214 | B2 | 9/2003 | Zimmer et al. |
| 6,624,237 | B2 | 9/2003 | Biteau et al. |
| 6,635,700 | B2 | 10/2003 | Cruse et al. |
| 6,649,684 | B1 | 11/2003 | Okel |
| 6,653,365 | B2 | 11/2003 | Jia |
| 6,660,823 | B1 | 12/2003 | Lichtenhan et al. |
| 6,683,135 | B2 | 1/2004 | Cruse et al. |
| 6,689,834 | B2 | 2/2004 | Ackermann et al. |
| 6,696,155 | B1 | 2/2004 | Takano et al. |
| 6,727,339 | B2 | 4/2004 | Luginsland et al. |
| 6,767,930 | B1 | 7/2004 | Svejda et al. |
| 6,770,724 | B2 | 8/2004 | Lichtenhan et al. |
| 6,774,202 | B2 | 8/2004 | Lee |
| 6,774,569 | B2 | 8/2004 | de Vries et al. |
| 6,811,684 | B2 | 11/2004 | Mohr et al. |
| 6,821,632 | B2 | 11/2004 | Topp et al. |
| 6,830,826 | B2 | 12/2004 | Brabant et al. |
| 6,841,197 | B2 | 1/2005 | Standke et al. |
| 6,852,794 | B2 | 2/2005 | Puhala et al. |
| 6,878,768 | B2 | 4/2005 | Tardivat et al. |
| 6,890,981 | B1 | 5/2005 | Luginsland |
| 6,903,150 | B2 | 6/2005 | Zimmer et al. |
| 6,911,518 | B2 | 6/2005 | Lichtenhan et al. |
| 6,919,469 | B2 | 7/2005 | Van Ooij et al. |
| 6,927,270 | B2 | 8/2005 | Lichtenhan et al. |
| 6,936,663 | B1 | 8/2005 | Modisette |
| 6,972,312 | B1 | 12/2005 | Lichtenhan et al. |
| 7,119,150 | B2 | 10/2006 | Lin et al. |
| 7,201,944 | B2 | 4/2007 | Hergenrother et al. |
| 7,393,564 | B2 | 7/2008 | Hergenrother et al. |
| 7,432,321 | B2 | 10/2008 | Joshi et al. |
| 7,732,016 | B2 | 6/2010 | van Ooij et al. |
| 7,799,870 | B2 | 9/2010 | Hergenrother et al. |
| 7,915,368 | B2 | 3/2011 | Hergenrother et al. |
| 8,029,906 | B2 | 10/2011 | Van Ooij et al. |
| 8,097,674 | B2 | 1/2012 | Hergenrother et al. |
| 2001/0011046 | A1 | 8/2001 | Ichikawa et al. |
| 2002/0055011 | A1 | 5/2002 | Brabant et al. |
| 2002/0055564 | A1 | 5/2002 | Cruse et al. |
| 2002/0061409 | A1 | 5/2002 | Topp et al. |
| 2003/0055193 | A1 | 3/2003 | Lichtenhan et al. |
| 2003/0059393 | A1 | 3/2003 | Wrolson et al. |
| 2003/0088034 | A1 | 5/2003 | Luginsland et al. |
| 2003/0130388 | A1 | 7/2003 | Luginsland et al. |
| 2003/0199619 | A1 | 10/2003 | Cruse |
| 2004/0042880 | A1 | 3/2004 | Lee |
| 2004/0042980 | A1 | 3/2004 | Kanji et al. |
| 2004/0122180 | A1 | 6/2004 | Hergenrother et al. |
| 2004/0210001 | A1 | 10/2004 | Cruse et al. |
| 2004/0266968 | A1 | 12/2004 | Korth et al. |
| 2005/0009982 | A1 | 1/2005 | Inagaki et al. |
| 2005/0010012 | A1 | 1/2005 | Jost et al. |
| 2005/0079364 | A1 | 4/2005 | van Ooij et al. |
| 2005/0244659 | A1* | 11/2005 | Higuchi et al. ............... 428/447 |
| 2005/0277717 | A1 | 12/2005 | Joshi et al. |
| 2006/0083925 | A1 | 4/2006 | Laine et al. |
| 2006/0086450 | A1 | 4/2006 | Hogan et al. |
| 2006/0089446 | A1 | 4/2006 | Lin et al. |
| 2006/0089504 | A1 | 4/2006 | Ito et al. |
| 2006/0147731 | A1 | 7/2006 | Grimberg et al. |
| 2006/0210813 | A1 | 9/2006 | Fath et al. |
| 2006/0217473 | A1* | 9/2006 | Hergenrother et al. ....... 524/261 |
| 2007/0059448 | A1 | 3/2007 | Smith et al. |
| 2007/0275255 | A1 | 11/2007 | Ooms et al. |
| 2008/0293858 | A1 | 11/2008 | Hergenrother et al. |
| 2009/0005481 | A1 | 1/2009 | Ishida et al. |
| 2009/0165913 | A1 | 7/2009 | Hergenrother et al. |
| 2009/0171014 | A1 | 7/2009 | Hergenrother et al. |
| 2009/0181248 | A1 | 7/2009 | van Ooij et al. |
| 2009/0326255 | A1 | 12/2009 | Hergenrother et al. |
| 2010/0071818 | A1 | 3/2010 | Hergenrother et al. |

FOREIGN PATENT DOCUMENTS

| | | |
|---|---|---|
| EP | 1995267 A2 | 11/2008 |
| JP | 6306173 A | 11/1994 |
| JP | 7292108 A | 11/1995 |
| JP | H8155287 A | 6/1996 |
| JP | 10059984 A | 3/1998 |
| JP | H10292048 A | 11/1998 |
| JP | 11343366 | 12/1999 |
| JP | 2001-205187 A | 7/2001 |
| JP | 2002-138164 | 5/2002 |
| JP | 2004-521992 A | 7/2004 |
| JP | 2005-029771 A | 2/2005 |
| JP | 2006-137821 A | 6/2006 |
| JP | 2006-285017 A | 10/2006 |
| KR | 2002-0078721 A | 10/2002 |
| WO | 03091314 A1 | 11/2003 |
| WO | 2005-093002 | 10/2005 |
| WO | 2006-031434 | 3/2006 |
| WO | 2006102518 A1 | 9/2006 |
| WO | 2008-025846 | 3/2008 |
| WO | 2009-085181 | 7/2009 |

OTHER PUBLICATIONS

Boiling Point Calculator from the web site http://www.trimen.pl/witek/calculators/wrzenie.html, downloaded Nov. 10, 2009 (2 pp.).

Hergenrother, William L. et al., "Reduction of Volatile Organic Compound Emission. I. Synthesis and Characterization of Alkoxy-Modified Silsesquioxane", Journal of Applied Polymer Science, vol. 115, pp. 79-90 (2010).

Nazina, Elena E., Mar. 22, 2010 Office Action from corresponding Russian Patent Application No. 2007139319 (6 pp.).

Cho, Han Sol, Apr. 20, 2010 International Search Report from PCT/US2009/069587 (4 pp.).

Xue, Haijiao, English translation of Apr. 27, 2010 First Office Action from corresponding Chinese Patent Application No. 200680018058.2 (11 pp.).

Salvitti, Michael A., Sep. 2, 2010 Final Office Action from corresponding U.S. Appl. No. 12/344,804 (14 pp.).

Zimmer, Marc S., Oct. 5, 2010 Office Action from corresponding U.S. Appl. No. 12/347,017 (10 pp.).

Zimmer, Marc S., Apr. 21, 2011 Notice of Allowance from corresponding U.S. Appl. No. 12/347,017 (5 pp.).

Brown, Jr., John F. et al., "The Polycondensation of Phyenlsilanetriol", Journal of the American Chemical Society, vol. 87, No. 19, pp. 4317-4324 (Oct. 5, 1965).

Dittmar, Uwe et al., "Funktionalisierte Octa-(propylsilsesquioxane)(3-$XC_3H_6$)$_8$($Si_8O_{12}$) Modellverbindungen fur oberflachenmodifizierte Kieselgele", Journal of Organometallic Chemistry, 489 pp. 185-194, (1995) [with English translation].

Dzhafarov, A.A. et al., "Synthesis and Properties of Organosilicon, Organogermanium, and Organotin Compounds [2-(Arylthio)Ethyl]-Silanes,—Germanes, and—Stannanes", Kalinin State University, Institute of Oil-Additive Chemistry, Academy of Sciences of the Azerbaidzhan SSR. Translated from Zhurnal Obshchei Khimii, vol. 45, No. 9, pp. 2023-2025, Sep. 1975.

Joshi, Mangala et al., "Polymeric Nanocomposites—Polyhedral Oligomeric Silsesquioxanes (POSS) as Hybrid Nanofiller", Journal of Macromolecular Science, Part C—Polymer Reviews, vol. 44, No. 4, pp. 389-410 (2004).

Rikowski, Eckhard et al., "Cage-rearrangement of silsesquioxanes", Polyhedron, vol. 16, No. 19, pp. 3357-3361 (1997).

van Ooij, W.J., "Mechanism and Theories of Rubber Adhesion to Steel Tire Cords", Rubber Chemistry and Technology, vol. 57, No. 3, pp. 421-456 (1984).

Product brochure, Gelest, Inc., "PolySilsesquioxanes and T-Resins $RSiO_{1.5}$", pp. 39-42, (2004).

Buestrich, R., Jul. 24, 2006 International Search Report from PCT Patent Application No. PCT/US2006/010610 (2 pp.).

Hergenrother, William L. et al., U.S. Appl. No. 12/344,804, filed Dec. 29, 2008 entitled "Methods of Making Blocked-Mercapto Alkoxy-Modified Silsesquioxane Compounds".

Hergenrother, William L. et al., U.S. Appl. No. 12/347,017, filed Dec. 31, 2008 entitled "Amino Alkoxy-Modified Silsesquioxanes in Silica-Filled Rubber With Low Volatile Organic Chemical Evolution".

Hergenrother, William L. et al., U.S. Appl. No. 12/347,047, filed Dec. 31, 2008 entitled "Method for Making Alkoxy-Modified Silsesquioxanes and Amino Alkoxy-Modified Silsesquioxanes".

Hergenrother, William L. et al., U.S. Appl. No. 12/347,086, filed Dec. 31, 2008 entitled "Amino Alkoxy-Modified Silsesquioxane Adhesives for Improved Metal Adhesion and Metal Adhesion Retention to Cured Rubber".

Peng, Kuo Liang, Nov. 18, 2010 Notice of Allowance from corresponding U.S. Appl. No. 11/752,715 (5 pp.).

Salvitti, Michael A., Dec. 27, 2010 Advisory Action from corresponding U.S. Appl. No. 12/344,804 (7 pp.).

Salvitti, Michael A., Apr. 29, 2010 Office Action from corresponding U.S. Appl. No. 12/344,804 (11 pp.).

Peng, Kuo Liang, May 18, 2010 Office Action from corresponding U.S. Appl. No. 11/752,715 (7 pp.).

Zimmer, Marc S., Jun. 26, 2009 Office Action from U.S. Appl. No. 11/387,569 (6 pp.).

Peng, KuoLiang, May 11, 2011 Office Action from U.S. Appl. No. 12/347,047 (8 pp.).

Xue, Haijiao, May 19, 2011 Office Action with English translation from Chinese Patent Application No. 200680018058.2 (9 pp.).

Salvitti, Michael A., May 26, 2011 Office Action from U.S. Appl. No. 12/344,804 (11 pp.).

Peng, Kuo Liang, Nov. 17, 2011 Final Office Action from U.S. Appl. No. 12/347,047 (10 pp.).

Salvitti, Michael A., Nov. 25, 2011 Final Office Action from U.S. Appl. No. 12/344,804 (15 pp.).

Sheh, Anthony H., Feb. 6, 2012 Office Action from U.S. Appl. No. 12/347,086 (12 pp.).

Kamimura, N., English translation of Feb. 7, 2012 Office Action from Japanese Patent Application No. 2008-503194 (7 pp.).

Zimmer, Marc S., Feb. 15, 2012 Office Action from U.S. Appl. No. 12/883,778 (8 pp.).

Peng, Kuo Liang, Mar. 1, 2012 Office Action from U.S. Appl. No. 12/347,047 (7 pp.).

Peng, Kuo Liang, Mar. 22, 2012 Office Action from U.S. Appl. No. 13/030,611 (7 pp.).

Jin, Ma, English translation of Apr. 5, 2012 Office Action from Chinese Application No. 200810214703.9 (5 pp.).

Salvitti, Michael A., Apr. 6, 2012 Advisory Action from U.S. Appl. No. 12/344,804 (8 pp.).

English translation of Apr. 6, 2012 Office Action from Chinese Application No. 200910161911.1 (7 pp.).

Buestrich, Ralf, Apr. 23, 2012 Office Action from European Patent Application No. 10075613.9 (6 pp.).

Buestrich, Ralf, Apr. 24, 2012 Office Action from European Patent Application No. 06739416.3 (6 pp.).

Zimmer, Marc S., Jun. 21, 2012 Notice of Allowance from U.S. Appl. No. 12/883,778 (4 pp.).

Loewe, Robert S., Jun. 25, 2012 Office Action from U.S. Appl. No. 13/174,129 (7 pp.).

Peng, Kuo Liang, Aug. 6, 2012 Office Action from U.S. Appl. No. 13/030,611 (11 pp.).

Peng, Kuo Liang, Aug. 9, 2012 Final Office Action from U.S. Appl. No. 12/347,047 (7 pp.).

Oct. 12, 2012 Office Action with English translation from Chinese Application No. 200910161911.1 (9 pp.).

Loewe, Robert S., Oct. 15, 2012 Final Office Action from U.S. Appl. No. 13/174,129 (8 pp.).

Baney, Ronald H. et al., "Silsesquioxanes," Chem. Rev. vol. 95, pp. 1409-1430 (1995).

Grubb, W.T., "A Rate Study of the Silanol Condensation Reaction at 25 degrees in Alcoholic Solvents," J. Am. Chem. Soc., 76, pp. 3408-3414 (1954).

Li, Guizhi et al., "Polyhedral Oligomeric Silsesquioxane (POSS) Polymers and Copolymers: A Review," Journal of Inorganic and Organometallic Polymers, vol. 11, No. 3, pp. 123-154 (2002).

Jin, Ma, Jan. 6, 2013 Office Action with English translation from Chinese Application No. 200810214703.9 (6 pp.).

Loewe, Robert S., Jan. 31, 2013 Office Action from U.S. Appl. No. 13/174,129 (8 pp.).

Kamimura, N., Feb. 5, 2013 Office Action with English translation from Japanese Application No. 2008-503194 (7 pp.).

Mar. 4, 2013 Office Action with English translation from Chinese Application No. 200980157744.1 (16 pp.).

Shinagawa, Yoko, May 7, 2013 Office Action with English translation from Japanese Application No. 2008-134163 (9 pp.).

Loewe, Robert S., May 9, 2013 Final Office Action from U.S. Appl. No. 13/174,129 (6 pp.).

Barrere, Matthieu, May 31, 2013 Extended European Search Report from European Application No. 09837079.4 (8 pp.).

Salvitti, Michael A., Jun. 10, 2013 Office Action from U.S. Appl. No. 12/344,804 (17 pp.).

* cited by examiner

AMINO ALKOXY-MODIFIED SILSESQUIOXANES AND METHOD OF PREPARATION

RELATED APPLICATIONS

This application claims priority to U.S. Provisional Application Ser. Nos. 61/018,213 and 61/017,932 filed Dec. 31, 2007, and 61/086,236 filed Aug. 5, 2008, the disclosures of which are incorporated herein by reference.

BACKGROUND OF THE INVENTION

As the present trend in tire-making technology continues toward the use of higher silica loadings in rubber compounds, there is a challenge to contain levels of environmentally released volatile organic compounds (VOC), especially alcohol, during compounding, processing, cure and storage of silica-reinforced rubbers.

In our U.S. patent application Ser. No. 11/387,569, filed Mar. 23, 2006, the entire disclosure of which is hereby incorporated by reference, we described the preparation of alkyl alkoxy-modified silsesquioxane (alkyl AMS) compounds and alkyl/mercaptan co-alkoxy-modified silsesquioxane (alkyl/mercaptan co-AMS) compounds that generate less alcohol than conventional alkoxysilane-containing silica-coupling and/or silica dispersing agents used in rubber compounding. It was found that the decreased amount of alcohol produced when using the alkyl AMS and alkyl/mercaptan co-AMS compounds in rubber compositions resulted in vulcanized rubber compounds having one or more improved properties such as, but not limited to, enhanced rubber reinforcement, increased polymer-filler interaction and lower compound viscosity, providing for tires having improved wet and snow traction, lower rolling resistance, increased rebound and decreased hysteresis.

In the aforementioned patent application, we described AMS and co-AMS compounds that can be made by subjecting one or more trialkoxysilanes to hydrolysis and condensation in an aqueous alcohol solution in the presence of a hydrolysis and condensation catalyst such as, but not limited to, a strong acid (e.g., hydrochloric acid, sulfuric acid, phosphoric acid, and the like), a strong base (e.g., sodium hydroxide, potassium hydroxide, lithium hydroxide, and the like), a strong organic acid, and a strong organic base (e.g. hindered amine bases, guanidines, and the like). However, at the time of filing the above-referenced patent application, it was unknown how to produce similar AMS compounds that also contained amino groups, i.e., an amino AMS, an amino/mercaptan co-AMS, and an amino/blocked mercaptan co-AMS, because of special problems that might be encountered when using strong acids, strong organic acids, strong bases and strong organic bases as hydrolysis and condensation catalysts. It was also unknown what effects the addition of such amino AMS and/or amino co-AMS compounds to rubber compounds would have on the properties of such rubber compounds and components of tires containing the rubber compounds.

SUMMARY OF THE INVENTION

The invention provides an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and a weak acid-neutralized solid or aqueous solution thereof, and having the formula

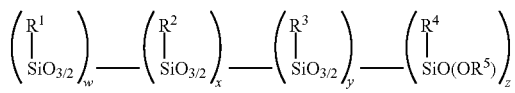

wherein w, x, y and z represent mole fractions, z does not equal zero, at least one of w, x or y must also be present, and $w+x+y+z=1.00$; wherein at least one of $R^1$, $R^2$, $R^3$ and $R^4$ must be present and selected from the group consisting of $R^6Z$, wherein Z is selected from the group consisting of $NH_2$, $HNR^7$ and $NR^7_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 5 carbon atoms, cycloalkyl groups having 3 to about 20 carbon atoms, and alkylaryl groups having 7 to about 20 carbon atoms.

In a very suitable arrangement, the amino AMS comprises an amino/mercaptan co-AMS. As employed in this description, the term "amino/mercaptan co-AMS" is meant to include the amino/blocked mercaptan co-AMS, unless otherwise designated. The term "amino AMS" is also meant to encompass an amino co-AMS that can comprise other molecules, especially, but not limited to, those having groups that can react with rubber.

The mixture of amino alkoxy-modified silsesquioxanes consists essentially of amino alkoxy-modified silsesquioxanes having an open cage structure or ladder-like structure with a reactive alkoxysilyl group and essentially free of closed caged polyhedral organosilsesquioxanes. The mixture of amino alkoxy-modified silsesquioxanes liberates about 0.05% to about 10% by weight alcohol when treated by substantially total acid hydrolysis.

The invention also provides methods for making an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and a weak acid-neutralized solid or aqueous solution thereof. The method comprises the steps of (a) combining as a reaction mixture (i) water, (ii) a solvent for the water, (iii) a hydrolysis and condensation catalyst, (iv) an optional weak acid, (v) an aminotrialkoxysilane, and (vi) an optional selection from the group consisting of a mercapto-alkyltrialkoxysilane, a blocked mercaptoalkyltrialkoxysilane, and mixtures of these; (b) allowing the reaction mixture to react for about 0.5 hours to about 200 hours to form an amino alkoxysilane-modified silsesquioxane; and (c) recovering the amino alkoxysilane-modified silsesquioxane from the reaction mixture. In a very suitable arrangement, the reaction mixture includes an aminotrialkoxysilane and a selection from the group consisting of a mercaptoalkyltrialkoxysilane, a blocked mercaptoalkyltrialkoxysilane, and mixtures thereof.

The amino AMS and amino co-AMS products are very suitable for use as silica coupling and/or silica dispersing agents in rubber compounds with reduced VOC emission, and as improved adhesive coatings for wire cords in tires, as disclosed in our U.S. Provisional Patent Application Ser. Nos. 61/018,213 and 61/086,236, noted above.

DETAILED DESCRIPTION OF THE INVENTION

In one arrangement, the invention provides an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and a weak acid-neutralized solid or aqueous solution thereof, and having the formula

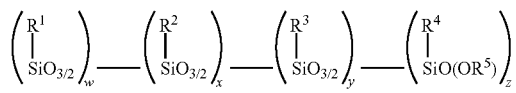

wherein w, x, y and z represent mole fractions, z does not equal zero, at least one of w, x or y must also be present, and w+x+y+z=1.00;

and wherein at least one of $R^1$, $R^2$, $R^3$ and $R^4$ must be present and selected from the group consisting of $R^6Z$, wherein Z is selected from the group consisting of $NH_2$, $HNR^7$ and $NR^7{}_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7{}_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 5 carbon atoms, cycloalkyl groups having 3 to about 20 carbon atoms, and alkylaryl groups having 7 to about 20 carbon atoms.

Without being bound by theory, it is believed that amino AMS and amino co-AMS structures are not closed cage structures but are open cage structures or ladder-like structures having a reactive alkoxysilane group present, because at least one of the $R^1$ silane atoms, $R^2$ silane atoms and $R^3$ silane atoms in every molecule is attached to a silane that has an alkoxy (OR) group. In contrast to the amino AMS structures according to the invention, a closed caged structure such as a polyhedral oligomeric silsesquioxane (POSS) or the like, contains substantially no Si—OR (alkoxysilane) bonds, but only Si—O—Si bonds. The amino AMS mixture has a multitude of structures that, as such, cannot be identified by a spectrum of one pure component. However, the strength of the $^{29}$Si NMR in different parts per million (ppm) regions can be used to characterize the distribution of the condensation products, as described in Table 6 of our U.S. patent application Ser. No. 11/387,569.

Like the AMS mixtures described in the aforementioned patent application, the mixture of amino alkoxy-modified silsesquioxanes liberates about 0.05% to about 10%, about 0.5% to about 8%, or about 1% to about 6% by weight alcohol when treated by substantially total acid hydrolysis.

At least one of the $R^1$, $R^2$, $R^3$ and $R^4$ groups of the amino alkoxy-modified silsesquioxane comprises a group that can bind to an elastomer. Such groups include, but are not limited to, acrylates, methacrylates, amino, vinyl, mercapto, sulfur and sulfide groups, and the like. Optionally, the reaction with the living end of a polymer after anionic polymerization can couple the alkoxy-modified silsesquioxane to the polymer. In one arrangement, the at least one of the $R^1$, $R^2$, $R^3$ and $R^4$ groups of the amino alkoxy-modified silsesquioxane can be, but is not limited to, a mercaptoalkyl group, a blocked mercaptoalkyl group, and an organo group containing a chain of about 2 to about 8 sulfur atoms, and the like. In a particularly suitable arrangement for use in rubber compounding, the amino AMS comprises an amino/mercaptan co-AMS.

In another suitable arrangement, the amino alkoxy-modified silsesquioxane is in an aqueous solution that has been neutralized by a weak acid, and has a pH of about 6.5 to about 4.0, suitably about 6.0 to about 5.0. Suitable weak acids can have a $pK_a$ of about 3.5 to about 6.5. For example, the weak acid can comprise, but is not limited to, a weak carboxylic acid. Such weak carboxylic acids can be, but are not limited to, acetic acid, ascorbic acid, itaconic acid, lactic acid, malic acid, naphthalic acid, benzoic acid, o-toluic acid, m-toluic acid, p-toluic acid, and the like, and mixtures thereof.

In a general, but non-limiting example, the amino AMS compound(s) can be made by subjecting an aminotrialkoxysilane to hydrolysis and condensation in an aqueous alcohol solution in the presence of a hydrolysis and condensation catalyst. The reaction is continued for a period of time sufficient for substantially total conversion of the aminotrialkoxysilane to the amino AMS compound(s). It has been found that controlling the amounts of water in the reaction mixture can speed the conversion of the reactants to the final product. The amino AMS product is then removed from the reaction mixture by distillation of the solvent after first neutralizing the amine and the catalyst. Solvent replacement with water will give a stable aqueous concentrated solution.

For use in rubber compounds, a suitable amino AMS can be prepared by the hydrolysis and condensation of an aminotrialkoxysilane. A suitable amino co-AMS compound can be manufactured by the co-hydrolysis and co-condensation of an aminotrialkoxysilane with, for example, a mercaptoalkyltrialkoxysilane to introduce a mercaptoalkyl functionality, or with a blocked mercaptoalkyltrialkoxysilane to introduce a blocked mercaptoalkyl functionality. In another arrangement, a blocking agent can be bonded to an amino AMS product containing an SH group subsequent to the condensation reaction, as described in the above-referenced U.S. patent application Ser. No. 11/387,569.

Examples of suitable aminotrialkoxysilane reactants include, but are not limited to, 3-[N-(trimethoxysilyl)-propyl]-ethylenediamine, 3-[N-(triethoxysilyl)-propyl]ethylenediamine, 3-aminopropyltriethoxysilane, and the like. Examples of suitable sulfur-containing trialkoxysilanes include, but are not limited to mercaptoalkyltrialkoxysilanes, blocked mercaptoalkyltrialkoxysilanes, 3-mercaptopropyltrialkoxysilane, 3-thioacylpropyltrialkoxysilane, 3-thiooctanoyl-propyltrialkoxysilane, and the like.

In this description the use of the term "blocked mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposes of this disclosure, the silica-reactive "mercaptosilane moiety" is defined as the molecular weight equivalent to the molecular weight of 3-mercaptopropyltriethoxysilane. A deblocking agent can be added during or after rubber compounding (e.g., later in the manufacturing process, such as during cure), after the silica-silane reaction has occurred, to allow the sulfur atom of the mercaptosilane to bond rapidly with the rubber. The deblocking agent can be added at any time during the compounding process as a single component during any mixing stage in which deblocking is desired. Examples of deblocking agents are well known to those skilled in the art.

A method of making an amino alkoxy-modified silsesquioxane comprising one or more compounds selected from the group consisting of an amino AMS, an amino/mercaptan co-AMS, an amino/blocked mercaptan co-AMS, mixtures thereof, and a weak acid-neutralized solid or aqueous solution thereof, and having the formula described above, comprises the steps of:

(a) combining as a reaction mixture: (i) water, (ii) a solvent for the water, (iii) a hydrolysis and condensation catalyst, (iv) an optional weak acid, (v) an aminotrialkoxysilane, and (vi) an optional selection from the group consisting of a mercaptoalkylrialkoxysilane, a blocked mercaptoalkyltrialkoxysilane, and mixtures thereof;

(b) allowing the reaction mixture to react for about 0.5 hours to about 200 hours to form an amino alkoxysilane-modified silsesquioxane; and (c) recovering the amino alkoxysilane-modified silsesquioxane from the reaction mixture.

Suitable hydrolysis and condensation catalysts for use in making the amino AMS compounds are known and include, but are not limited to, strong acids such as hydrochloric acid, sulfuric acid, phosphoric acid, toluenesulfonic acid, and the like; strong bases such as sodium hydroxide, potassium hydroxide, lithium hydroxide and the like; and strong organic acids and bases, such as DBU (1,8-diazabicyclo[5.4.0]undec-7-ene), DBN (1,5-diazabicylo-[4.3.0] non-5-ene), imidazoles, guanidines and the like; and mixtures of these. The hydrolysis and condensation catalyst is also suitably a solid strong cationic resin such as, but not limited to, those described in methods for making amino AMS compounds using such resins as disclosed in our U.S. Provisional Patent Application Ser. No. 61/017,932 filed Dec. 31, 2007, the entire disclosure of which is hereby incorporated by reference.

When the hydrolysis and condensation catalyst is selected from the group consisting of a strong acid, a strong organic acid and a solid strong cationic resin, the catalyst can be present in the reaction mixture in an amount sufficient to neutralize the amine functionality of the aminotrialkoxysilane and to catalyze hydrolysis and condensation of the aminotrialkoxysilane. Alternatively, a weak acid buffer can be added to the reaction mixture to neutralize the amine functionality. As described above, the weak acid suitably has a pH of about 6.5 to about 4.0, also suitably about 6.0 to about 5.0, and a $pK_a$ of about 3.5 to about 6.5. For example, the weak acid can comprise, but is not limited to, a weak carboxylic acid. Such weak carboxylic acids can be, but are not limited to, acetic acid, ascorbic acid, itaconic acid, lactic acid, malic acid, naphthalic acid, benzoic acid, o-toluic acid, m-toluic acid, p-toluic acid, and the like, and mixtures thereof.

The solvent for the water can be a polar protic solvent, a polar aprotic solvent, an aprotic solvent or a mixture of these. Suitable polar protic solvents can comprise an alcohol or a mixture of alcohols. Suitable aprotic solvent can comprise a hydrocarbon solvent for the mixture of amino alkoxy-modified silsesquioxanes. Exemplary aprotic solvents can be, but are not limited to, ether, tetrahydrofuran, 1,4-dioxane, 1,3-dioxolane, acetone, acetonitrile, ethyl acetate, and the like, and mixtures thereof.

Strong acid catalysts are particularly suitable for use in making the amino AMS compounds. The amount of the catalyst used is based upon the desired effective rate of the reaction. It will be recognized that when an alkyltrichlorosilane is used as the reactant, the addition of water to the reaction mixture will result in the production of hydrochloric acid, so no further catalyst is necessary to the reaction.

When an amino AMS is prepared with a strong liquid acid such as, but not limited to, hydrochloric acid, sulfuric acid, and the like, the resulting product can contain a residual amount of the acid which may be desirable to remove by, for example, neutralization with a base, or by other methods well known to those skilled in the chemical arts.

Further, acid-containing amino AMS products can demonstrate undesirable side reactions that may prevent extended use. For example, a side reaction can be a slow gel formation when an acidic amino AMS product is diluted with distilled water to a pH of 6.2 or higher. To overcome this problem, it was found that a weak acid buffer, suitably a buffer comprising a weak acid having a $pK_a$ of about 3.5 to about 6.5, such as a carboxylic acid buffer can be used to prevent an increase in pH upon dilution and aging. The amount of the weak acid is that sufficient to prevent the slow gel formation, and can be determined without undue experimentation. Therefore, in the method of making the amino alkoxy-modified silsesquioxane, the recovering step (c) can include the substep of adding the optional weak acid (iv) to the amino alkoxysilane-modified silsesquioxane product. Thus, the weak acid buffer (which is not an AMS catalyst) can also act as a stabilizer so that the amine salt in water will not further condense to give an insoluble gelled structure. It is recognized that other methods of preventing the gel formation can be used, as known to those skilled in the chemical arts.

Another side reaction that can occur is the formation of a slightly cloudy amino AMS when a strong organic base such as, but not limited to, an amine, is used as a catalyst in place of an acid. However, it was found that the cloudiness can be eliminated by the addition of a reducing agent that can act to cleave S—S single bonds to form SH bonds and form a clear aqueous stable solution of the amino AMS. Sodium borohydride is a well-known reducing agent that is suitable for use for this purpose; however, it is to be understood that the invention is not limited to the use of sodium borohydride, as other suitable reducing agents that can act to cleave S—S single bonds to form SH bonds are known to those skilled in the art and would be suitable in the present method. The amount of the reducing agent is the amount that is sufficient to produce a clear aqueous solution of the amino AMS. Therefore, when the hydrolysis and condensation catalyst comprises a strong base, a strong organic base, or mixtures of these, the method can further comprise the substep of adding an S—S bond reducing agent to the reaction mixture in step (a), or to the amino alkoxysilane-modified silsesquioxane recovered in step (c), or to both steps (a) and (c).

The temperature at which the reaction takes place is not critical except that it be less than the boiling point of the solvent, although the use of a pressure vessel for the reaction will allow higher temperatures to be used. For example, almost identical yields of amino AMS product can be obtained from ambient temperature (about 25° C.) to about 60° C. to about 100° C. The temperature at which the reaction takes place is not critical except that it be less than the boiling point of the solvent, although the use of a pressure vessel for the reaction will allow higher temperatures to be used.

The period of time for total conversion of the reactants to the amino AMS product depends on the original concentration of the reactants and the optional addition of reactants and/or applied heat during the process. However, if no additional reactants are used, the time can range from about 0.5 hours to about 200 hours, often about 0.75 hours to about 120 hours, or about one hour to about 72 hours.

Amino co-AMS compounds can be obtained by co-reacting any aminotrialkoxysilane by hydrolysis and condensation with another compound that can provide a functional group ($R^6X$, as defined above) on the amino AMS compound. For example, for use in rubber compounds, it may be desirable to produce an amino co-AMS compound containing a sulfur atom that can bind to an elastomer. Therefore, a suitable amino co-AMS compound can be manufactured by the co-hydrolysis and co-condensation of an aminoalkyltrialkoxysilane with, for example, a mercaptoalkyltrialkoxysilane to introduce a mercaptoalkyl functionality, or with a blocked mercaptoalkyltrialkoxysilane to introduce a blocked mercaptoalkyl functionality. As described above, the blocking agent can be added subsequent to the condensation reaction when the amino AMS product contains an SH group.

In this description the use of the term "blocked mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposes of this disclosure, the silica-reactive "mercaptosilane moiety" is defined as the molecular weight equivalent to the molecular weight of γ-mercaptopropyl triethoxysilane. A deblocking agent can be added later in the manufacturing process, after the silica-silane reaction has occurred, to allow the sulfur atom of the mercaptosilane to bond rapidly with the rubber. The deblocking agent can be added at any time during the compounding process as a single component during any mixing stage in which deblocking is desired. Often deblocking is desired during the curing stage of compounding and the addition of the deblocking agent is added in the final mixing stage. The deblocking agent can be contained in a sulfur cure package and, often, can function as a cure accelerator, especially in combination with a zinc salt. Examples of deblocking agents are well known to those skilled in the art.

The resulting amino AMS and/or amino/mercaptan co-AMS products are usually a mixture of oligomers of all sizes, from which one or more compounds of specific size or molecular weight can be separated from the mixture by known methods, such as chromatography and the like. A feature of each of the amino AMS or amino/mercaptan co-AMS products produced is the presence of a reactive alkoxysilyl group "z" attached to one or more amino alkoxy-modified silsesquioxane "w," "x" and/or "y" groups. In an amino AMS compound, at least one of the mole fractions w, x or y must be present, z does not equal zero, and $w+x+y+z=1.00$. The mole fraction of the one or more w, x, y or z groups is calculated as the mole fraction of w, x, y or z divided by the sum of the mole fractions $w+x+y+z$. Suitably, ratios of the w mole fraction (or the ratio of the x mole fraction) to the sum of the $w+x+y+z$ fraction can range from about 0.01 to about 0.5. The mole fractions of w, x, y and z also can be measured through the mole fractions of $R^1$, $R^2$, $R^3$ and $R^4$ if the relative abundance of those groups can be measured.

The individual weight fractions of w, x, y and z can be calculated from the mole fraction of each times their respective formula weight divided by the sum of the individual w, x, y and z weight fractions.

The amino alkoxy-modified silsesquioxanes made using these methods consist essentially of "open" structures having the reactive alkoxysilyl group and are essentially free of pure closed caged polyhedral organosilsesquioxanes (POSS) structures that are known for use as nanoparticle fillers in various compounds. Without being bound by theory, it is believed that the method of preparation of the amino AMS and amino co-AMS products, described above, precludes or minimizes the formation of pure POSS structures because of the myriad of different geometric attachments that the rapid condensation of an aminotrialkoxysilane generates.

Another important feature of each of the amino AMS or amino co-AMS products produced is that the reactive alkoxysilyl group is present in such a small amount that only a small amount of alcohol can be liberated by hydrolysis of the product. That is, the z alkoxysilyl group generates only about 0.05% to about 10% by weight alcohol when the product is treated by substantially total acid hydrolysis. Suitably, the amount of generated alcohol is about 0.5% to about 8% by weight and, suitably, the amount of generated alcohol is about 1% to about 6% by weight.

Therefore, the amino AMS or amino co-AMS product(s) produced are very suitable for use in rubber compositions in which silica is employed as a reinforcing filler. In particular, the reactive alkoxysilane group(s) attached to the amino AMS or amino co-AMS products can participate in the alkoxysilane-silica reaction and can improve silica dispersion in the rubber. As discussed above, the alkoxysilane-silica reaction produces alcohol as a by-product when trialkoxysilanes and/or alkoxysilane-terminated polymer groups are used for silica dispersion in rubber compounds. Usually, the trialkoxysilane employed is a triethoxysilane or a trimethoxysilane, and the generated alcohol is ethanol or methanol, respectively. Because these alcohol emissions add to the VOC emissions generated from processing of the other rubber tire components, the amount of reinforcing silica and concomitant amount of trialkoxysilane employed is governed and limited by government environmental regulations.

Without being bound by theory, it is believed that the limited amount of alcohol that is available in the amino AMS or amino co-AMS product(s) make these compounds very useful in rubber compounds because they have the potential to reduce the level of potential VOCs emitted as alcohol during compounding and further processing. Moreover, it is believed that the limited amount of available unreacted alkoxysilane groups during and after mixing, could advantageously limit the degree of blistering in the vulcanized rubber compounds and tires made from them. Moreover, it is believed that the use of the products of the invention could allow a significant increase in the amount of silica used for reinforcement.

EXAMPLES

The following examples illustrate methods of preparation of representative amino AMS and amino co-AMS products. However, the examples are not intended to be limiting, as other amino AMS and amino co-AMS product, alone or in combination, can be prepared according to the described methods. Moreover, the methods are exemplary only and other methods for preparing the products employing other reactants can be determined by those skilled in the art without departing from the scope of the invention herein disclosed and claimed.

Example 1

Preparation of 3-aminopropyl AMS Hydrochloride

To a one liter flask was added 300 mL of absolute ethanol, 24.42 g of 3-aminopropyl triethoxysilane (110 mmol), 21.6 mL of 12N hydrochloric acid (259 mmol acid and 900 mmol water) and 16.6 mL of water (920 mmol). The solution immediately became cloudy upon mixing and, after standing 3 days at ambient temperature, gave a viscous semi-crystalline mass. The solvent was decanted, purged with nitrogen to remove the remaining solvent, and vacuum dried to give 16.28 g of a white crystalline hydrochloride salt. The theoretical yield (TY) was 16.13 g. The solid was readily soluble in about 120 mL of distilled water to give 149.69 g of a clear solution, which contained about 10.8% total solids and a density of 1.035 g/mL. This solution had a calculated AMS concentration of 0.761 N in silicone. The pH was about 1.0. Titration with standard sodium hydroxide indicated the solution to be 0.0045 N in free hydrochloric acid.

Example 2

Preparation of co-AMS Containing 3-mercaptopropyl and 3-aminopropyl co-AMS Hydrochloride in a 45:55 Ratio The procedure of Example 1 was followed, except that the alkoxysilane components were 23.35 g of 3-aminopropyl triethoxysilane (105.2 mmol) and 16.27 g of 3-mercaptopropyl triethoxysilane (84.6 mmol). A cloudy solution was initially formed that remained unchanged after 18 hours. Heating this solution to 50° C. to 60° C. with a nitrogen purge removed most of the solvent to give a white waxy solid which did not change upon vacuum drying. The addition of about 100 mL of water gave a slightly cloudy solution and a small amount (0.56 g) of a solid that was removed. The 130.72 g of solution did not further change upon standing. This solution had a density of 1.061 g/mL and a calculated concentration of 1.44 N of co-AMS. This represented 19.4% total solids. Titration showed the presence of free hydrochloric acid to give a 0.800 N solution.

Example 3

Preparation of co-AMS Containing 3-octanoylthio-1-propyl and 3-aminopropyl co-AMS Hydrochloride in a Ratio of 31:69

The procedure of Example 1 was followed, except that the alkoxysilane components were 28.6 g of 3-aminopropyl triethoxysilane (129.2 mmol) and 21.44 g of 3-octanoylthio-1-propyltriethoxysilane (NXT™) (58.8 mmol). A cloudy solution was initially formed and remained unchanged after 18 hours. Heating this solution to 50° C. to 60° C. with a nitrogen purge removed most of the solvent to give a white waxy solid which, upon vacuum drying, gave 33.68 g of a white crystalline powder. The addition of about 200 mL of water was needed to give a mixture that could be stirred. A slightly cloudy fluid solution was obtained after overnight stirring. The 285.9 g of solution did not further change upon standing, had a density of 1.029 g/mL and a calculated concentration of 0.47 N of co-AMS. This represented 8.19% total solids based on the theoretical yield of product. Titration showed the presence of free hydrochloric acid to give a 0.022 N solution.

Example 4

Preparation of an Amino/Mercaptan Co-AMS with DBU as Catalyst

The use of an aqueous solution of an amino/mercaptan functional co-AMS prepared with hydrochloric acid has shown a side reaction that prevent long term usage. The first side reaction is slow gel formation when diluted with distilled water to a pH of 6.2 or higher. To overcome this problem, an acetate buffer was used to prevent the increase in pH upon dilution and aging. A second side reaction was the formation of a slightly cloudy AMS when an amine was used as the catalyst in place of an acid. The cloudy solution that was produced was eliminated by the addition of a small amount of sodium borohydride to the amine catalyzed co-AMS product. As a result, a clear aqueous stable solution of the amino/mercaptan co-AMS was formed. However, it is to be understood that the invention is not limited to the use of sodium borohydride, as other suitable reducing agents that can act to cleave S—S single bonds to form SH bonds are known to those skilled in the art and would be suitable in the present method.

The present example and Example 5 demonstrate the use of an acetate buffer and sodium borohydride.

To a 500 mL Erlenmeyer flask was added 34.21 g (155 mmol) of 3-aminopropyl triethoxysilane, 12.25 g (62 mmol) of 3-mercaptopropyl trimethoxysilane (28.8 mole %) and 241.65 g (308 mL) of absolute ethanol. To this mixture was then added 3.86 g (25 mmol) of 1,8-diazabicyclo[5.4.0]undec-7-ene (DBU) catalyst dissolved in 30.1 g (1.66 mol) of water. A clear solution was obtained that became slightly cloudy within 30 minutes. No phase separation occurred during the next 24 hours, with only a slight increase in cloudiness. The theoretical yield of product was 24.97 g.

About half of this co-AMS solution (sample A, 152.2 g) was added to 250 mL of a sodium acetate/acetic acid aqueous buffer prepared with 4.51 g sodium acetate and 4.1 g of acetic acid. The pH changed from about 3.0 to 9.0 upon the addition. Adjustment with 2.12 g of acetic acid gave a pH of 5.7. Further acetic acid addition of 0.72 g gave a final pH of 5.0. This solution was heated to about 80° C. to remove the ethanol and reduce the final volume to 209 mL of a 5.9 wt % AMS in water. Similarly, the remaining about half of the co-AMS solution (sample B) was buffered with the same acetate buffer containing an additional 2.58 g of acetic acid to give a pH of 5.8. The cloudiness could not be filtered or reduced with sodium borohydride. Both samples A and B were diluted to as low as 0.75 wt % with distilled water (pH 7.2) without any significant change in pH. The dilute solution did not change in clarity or viscosity on standing.

Example 5

Preparation of an Amino/Mercaptan Co-AMS with DBU as Catalyst and Added Sodium Borohydride To a 500 mL Erlenmeyer flask was added 32.98 g (149 mmol) of 3-aminopropyl triethoxysilane, 12.73 g (65 mmol) of 3-mercaptopropyl trimethoxysilane (30.2 mole %) and 241.68 g (308 mL) of absolute ethanol. To this mixture was then added 3.79 g (25 mmol) of DBU catalyst dissolved in 32.15 g (1.77 mol) of water and 1.76 g (5.29 mmol) of a solution of 0.20 g of sodium borohydride in 10 g of water. The clear solution was stirred for 66 hours with no cloudiness appearing. The addition of about half this solution (165.9 g) to the sodium acetate/acetic acid buffer described in Example 4, containing 4.47 g of extra acetic acid, gave a clear solution that was concentrated by heating to remove the ethanol, as described in Example 4, to give 21.3 g of a 5.9 wt %, pH 5.9, stable aqueous amino/mercaptan co-AMS. The pH decreased during the concentration procedure to a value of 4.8 (sample C). The remainder was similarly treated to give a 6.6 wt % solution with a pH of 5.5 that, when reduced to 183.3 g, had a pH of 5.0 (sample D). Both samples C and D remained clear upon dilution with distilled water and gave no cloudiness or gel.

Example 6

Preparation of a 40.3% Amino/Mercaptan co-AMS as an Aqueous Solution

The co-AMS was prepared by adding 5.3 g (23.9 mmol) of 3-[N-(trimethoxysilyl)-propyl]-ethylenediamine, 3.97 g (20.2 mmol) of 3-mercaptopropyl trimethoxysilane to 38 g of absolute ethanol, 5.74 g (315.7 mmol) of water and 0.40 g (2.60 mmol) of DBU catalyst in a 500 mL Erlenmeyer flask. The clear solution was allowed to stand for 17 hours in ambient conditions before adding 59 g of water and 3.92 g (65.7 mmol) of acetic acid. The pH was measured as 6.2. The ethanol was removed by heating at 70° C. to 80° C. with a nitrogen purge for one hour. A total of 50.31 g of solution was obtained. Dilution with 54.56 g of water gave a 5.6% solution of amino/mercaptan co-AMS with a pH of 6.2. The theoretical yield was 5.87 g of the co-AMS. This solution was used for adhesion studies by dilution to the indicated concentration with distilled water.

Example 7

Preparation of a 40.3% Amino/Mercaptan co-AMS as an Aqueous Solution with Organic Carboxylic Acid Neutralization The co-AMS was prepared by adding 5.3 g (23.9 mmol) of 3-[N-(trimethoxy-silyl)-propyl]-ethylenediamine, 3.97 g (20.2 mmol) of 3-mercaptopropyl trimethoxysilane (MPS) to 38 g of absolute ethanol, 5.74 g (315.7 mmol) of water and 0.40 g (2.60 mmol) of DBU in a 500 mL Erlenmeyer flask. Analysis of the amount of liberated methanol in this preparation indicated that almost all of the latent alcohol in the starting siloxanes was liberated in the first 5 to 30 minutes of reaction. The clear solution was allowed to stand for 15 to 24 hours at ambient temperature before adding 59 g of water and an equivalent (65.7 mmol) of an organic carboxylic acid was added to each of 5 different samples (13 through 17), as indicated in Table 1 below. The pH was measured to be less than 6.5. The ethanol and by-product methanol were removed by heating at 70° C. to 80° C. with a nitrogen purge for an hour. A VOC-free solution was obtained which was diluted with water to give a 5.6% solution of amino/mercaptan AMS with a pH<6.5. The expected yield was 5.87 g of the amino/mercaptan co-AMS was used to calculate the concentration of the solution prepared and for all further dilutions with distilled water to prepare subsequent dipping solutions that are used.

Table 1 illustrates the sample number, type and weight of organic carboxylic acid used, as well as the solubility in the reaction mixture and the resulting 5.6% aqueous solution of the amino/mercaptan co-AMS.

Example 8

Preparation of an Amino/Mercaptan Co-AMS with Organic Carboxylic Acid Neutralization and a Strong Cationic Resin Catalyst. In Particular, Preparation of a co-AMS with 30 mol % of a Mercaptopropyl Silane, and using a Dowex 50WX2-100E Strong Cationic Resin Catalyst A strong cationic resin catalyst was used to prepare a co-AMS containing an aminoalkylene silane, a mercaptopropyl silane and a weak carboxylic acid. The co-AMS product was readily obtained in an alcohol water solution by filtration from the insoluble cationic resin. After the reaction, the recovered strong cationic resin catalyst was available for reuse for subsequent synthesis reactions.

To a 250 mL Erlenmeyer flask was added 15.76 g (71.0 mmol) of 3-[N-(trimethoxy-silyl)-propyl]-ethylenediamine, 5.97 g (30.4 mmol) of 3-mercaptopropyl trimethoxysilane, 77.95 g (101.9 mL) of absolute ethanol, 8.68 g. (65.1 mmol) of acetic acid (1.07 equivalents/amine) and 11.97 g (664 mmol) of distilled water. To this solution was added 1.75 g of water washed and dried Dowex 50WX2-100E (7.07 mmol of acid) strong cationic polystyrene resin (containing 15.9% water by TGA, crosslinked with 2% divinylbenzene, 100 mesh extracted particles).

After stirring for 24 hours, the solution was still clear and the Dowex resin was separated by filtration through a medium sintered glass filter. The product as the acetate was recovered by evaporation of the solvent by heating and a nitrogen purge to give after drying 24.00 g (102% based on the salt) of a sticky viscous oil. The recovered Dowex resin weighed 1.89 g and contained 22.1% water, for total recovery of the resin. The latent alcohol concentration of the amino/mercaptan co-AMS was determined to be about 3%.

A total of 50 mL of an aqueous solution was prepared to be 23.3 wt % of the co-AMS. This solution was clear and stable at an adjusted pH of 6.0.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A method of making a weak acid-neutralized solid or a weak acid-neutralized aqueous solution thereof of an aminoalkoxy-modified silsesquioxane (amino AMS), an amino/mercaptan co-AMS, amino/blocked mercaptan co-AMS or mixtures thereof, and having the formula

TABLE 1

| Sample No. | Acid Used | Acid Equivalent grams added | Acid Equivalent acid/amine | Initial pH | Final pH | Total wt of 5.6% solution (grams) | Change with acid addition | 5.6% aqueous solution appearance initial | 5.6% aqueous solution appearance after 1 day |
|---|---|---|---|---|---|---|---|---|---|
| 1 | Acetic | 4.6 | 1.00 | 6.2 | 5.6 | 94.22 | clear | clear | clear |
| 2 | Ascorbic | 13.5 | 1.00 | 5.8 | 5.3 | 85.30 | yellow | brown | clear |
| 3 | Itaconic | 5.25 | 1.05 | 6.3 | 5.5 | 93.58 | cloudy, oily ppte. | soluble | clear |
| 4 | Lactic | 8.2 | 1.01 | 6.4 | 6.4 | 93.93 | clear | clear | clear |
| 5 | Malic | 5.41 | 0.53 | 5.5 | 5.3 | 93.45 | cloudy, oily ppte. | soluble | clear |

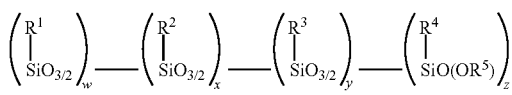

wherein w, x, y and z represent mole fractions, z does not equal zero, at least one of w, x or y must also be present, and w+x+y+z=1.00;

wherein at least one of $R^1$, $R^2$, $R^3$ and $R^4$ must be present and selected from the group consisting of $R^6Z$, wherein Z is selected from the group consisting of $NH_2$, $HNR^7$ and $NR^7{}_2$; and the remaining $R^1$, $R^2$, $R^3$ or $R^4$ are the same or different and selected from the group consisting of (i) H or an alkyl group having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7{}_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms, the method comprising the steps of:
(a) combining as a reaction mixture:
  (i) water,
  (ii) a solvent for the water,
  (iii) a hydrolysis and condensation catalyst,
  (iv) a weak acid having a $pK_a$ of about 3.5 to about 6.5,
  (v) an aminotrialkoxysilane, and
  (vi) an optional selection from the group consisting of a mercaptoalklytrialkoxysilane, a blocked mercaptoalkyl-trialkoxysilane, or another silane with a substituent corresponding to $R^1$, $R^2$, $R^3$ and $R^4$, and mixtures thereof;
b) allowing the reaction mixture to react for about 0.5 hours to about 200 hours to form an amino alkoxysilane-modified silsesquioxane; and
(c) recovering the amino alkoxysilane-modified silsesquioxane from the reaction mixture;
(d) optionally adding a weak acid having a $pK_a$ of about 3.5 to about 6.5 to the recovered silsesquioxane,
  wherein the amino alkoxy-modified silsesquioxanes consist essentially of a mixture of amino alkoxy-modified silsesquioxanes, each having an open structure and a reactive alkoxysilyl group and being essentially free of closed caged polyhedral organosilsesquioxanes,
  and wherein the mixture of the amino alkoxy-modified silsesquioxanes liberates about 0.05% to about 10% by weight alcohol when treated by substantially total acid hydrolysis.

2. The method of claim 1, wherein the reaction mixture includes an aminotrialkoxysilane and a selection from the group consisting of a mercaptoalkyl-trialkoxysilane, a blocked mercaptoalkyltrialkoxysilane, and mixtures thereof.

3. The method of claim 2, wherein the reaction mixture includes an aminotrialkoxysilane and a mercaptoalkyltrialkoxysilane, and wherein the hydrolysis and condensation catalyst comprises a selection from the group consisting of a strong base, a strong organic base, and mixtures thereof, and the method further comprises the substep of adding an S—S bond reducing agent to the reaction mixture in step (a), or to the amino alkoxysilane-modified silsesquioxane recovered in step (c), or to both steps (a) and (c).

4. The method of claim 3, wherein the reducing agent is present in an amount sufficient to form a clear aqueous stable solution of the amino AMS.

5. The method of claim 3, wherein the reducing agent comprises sodium borohydride.

6. The method of claim 1, wherein the hydrolysis and condensation catalyst is selected from the group consisting of a strong acid, a strong base, a strong organic acid, a strong organic base, a solid strong cationic resin, and mixtures thereof.

7. The method of claim 6, wherein the hydrolysis and condensation catalyst is selected from the group consisting of hydrochloric acid, sulfuric acid, phosphoric acid, toluenesulfonic acid, sodium hydroxide, potassium hydroxide, lithium hydroxide, DBU (1,8-diazabicyclo[5.4.0] undec-7-ene), DBN (1,5-diazabicylo[4.3.0] non-5-ene), imidazoles, guanidines, and mixtures thereof.

8. The method of claim 6, wherein the hydrolysis and condensation catalyst comprises a selection from the group consisting of a strong acid, a strong organic acid, a solid strong cationic resin, and mixtures thereof, and the combining as a reaction mixture step (a) includes the substep of adding a sufficient amount of the optional weak acid (iv) to the reaction mixture to substantially neutralize the amine functionality of the aminotrialkoxysilane.

9. The method of claim 6, wherein the hydrolysis and condensation catalyst comprises a selection from the group consisting of a strong acid, a strong organic acid, a strong base, and a strong organic base, and mixtures thereof, and the recovering step (c) includes the substep of adding the optional weak acid (iv) to the amino alkoxysilane-modified silsesquioxane in an amount sufficient to stabilize the silsesquioxane.

10. The method of claim 6, wherein the hydrolysis and condensation catalyst is selected from the group consisting of a strong acid, a strong organic acid and a solid strong cationic resin, and the catalyst is present in the reaction mixture (a) in an amount sufficient to neutralize the amino portion of the aminotrialkoxysilane and to catalyze hydrolysis and condensation of the aminotrialkoxysilane.

11. The method of claim 1, wherein the optional weak acid comprises a weak carboxylic acid.

12. The method of claim 11, wherein the weak carboxylic acid is selected from the group consisting of acetic acid, ascorbic acid, itaconic acid, lactic acid, malic acid, naphthalic acid, benzoic acid, o-toluic acid, m-toluic acid, p-toluic acid, and mixtures thereof.

13. The method of claim 1, wherein the solvent for the water is selected from the group consisting of a polar protic solvent, a polar aprotic solvent, an aprotic solvent, and mixtures thereof.

14. The method of claim 13, wherein the polar protic solvent comprises an alcohol or a mixture of alcohols.

15. The method of claim 13, wherein the aprotic solvent comprises a hydrocarbon solvent for the mixture of amino alkoxy-modified silsesquioxanes.

16. The method of claim 13, wherein the aprotic solvent is selected from the group consisting of ether, tetrahydrofuran, 1,4-dioxane, 1,3-dioxolane, acetone, acetonitrile, ethyl acetate, and mixtures thereof.

17. The method of claim 1, wherein the mixture of amino alkoxy-modified silsesquioxanes liberates about 0.5% to about 8% by weight alcohol when treated by substantially total acid hydrolysis.

* * * * *